US011655550B2

(12) United States Patent
Liang et al.

(10) Patent No.: US 11,655,550 B2
(45) Date of Patent: May 23, 2023

(54) ENGINEERING CATALYTICAL ELECTRODES FOR APPLICATIONS IN ENERGY AREAS

(71) Applicant: LAWRENCE LIVERMORE NATIONAL SECURITY, LLC, Livermore, CA (US)

(72) Inventors: Siwei Liang, Dublin, CA (US); Sarah E. Baker, Dublin, CA (US); Theodore F. Baumann, Discovery Bay, CA (US); Eric B. Duoss, Dublin, CA (US); Christopher M. Spadaccini, Oakland, CA (US); Cheng Zhu, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 519 days.

(21) Appl. No.: 16/845,985

(22) Filed: Apr. 10, 2020

(65) Prior Publication Data

US 2021/0317586 A1    Oct. 14, 2021

(51) Int. Cl.
*C25B 9/19*     (2021.01)
*C25B 1/02*     (2006.01)
(Continued)

(52) U.S. Cl.
CPC ............... *C25B 9/19* (2021.01); *C25B 1/02* (2013.01); *C25B 11/03* (2013.01); *C25B 11/031* (2021.01); *C25B 11/089* (2021.01); *H01M 8/0656* (2013.01); *Y02E 60/36* (2013.01); *Y02E 60/50* (2013.01); *Y02P 20/133* (2015.11)

(58) Field of Classification Search
CPC .... C25B 1/02; C25B 1/04; C25B 9/19; C25B 1/23; C25B 11/03; C25B 11/031; C25B 11/032; C25B 11/051; C25B 11/089
See application file for complete search history.

(56) References Cited

U.S. PATENT DOCUMENTS

| 2019/0145012 | A1* | 5/2019 | Murayama | ............ C25B 11/03 205/628 |
| 2020/0087233 | A1* | 3/2020 | Ono | ........................ C25B 9/73 |

FOREIGN PATENT DOCUMENTS

WO    WO-2020107029 A1 *   5/2020   ........... B29C 43/003

OTHER PUBLICATIONS

Pinaud et al., "Technical and economic feasibility of centralized facilities for solar hydrogen production via photocatalysis andphotoelectrochemistry," Energy Envron. Sci., 2013, vol. 6, pp. 1983-2002.

(Continued)

*Primary Examiner* — Nicholas A Smith
(74) *Attorney, Agent, or Firm* — Eddie E. Scott (57) ABSTRACT

An ink formulation and electrode that enhances hydrogen production, oxygen production, carbon dioxide reduction and other electrocatalytic reactions. Embodiments include an ink formulation with polymer binders having different catalytical precursors and a 3D electrode produced by additive manufacturing from the inventor's ink formulation. Various embodiments of the inventor's apparatus, systems, and methods provide inks that that are 3D-printed into patterns that optimize surface area and flow. The catalytic materials are imbedded into the ink matrix which is then printed into a 3D structure that has architecture that optimizes surface area and flow properties.

1 Claim, 11 Drawing Sheets

(51) Int. Cl.
    *C25B 11/03*     (2021.01)
    *C25B 11/089*     (2021.01)
    *C25B 11/031*     (2021.01)
    *H01M 8/0656*     (2016.01)

(56) References Cited

OTHER PUBLICATIONS

Shaner et al., "A comparative techneconomic analysis of renewable hydrogen production using solar energy," Energy Environ., Sci., 2016, 9, pp. 2354-2371.

Young et al., "Direct solar-to-hydrogen conversion via inverted metamorphic multi-junction semiconductor architectures," Nature Energy, 2, 17028, 2017, pp. 1-8.

\* cited by examiner

ENGINEERING CATALYTICAL ELECTRODES FOR APPLICATIONS IN ENERGY AREAS

STATEMENT AS TO RIGHTS TO APPLICATIONS MADE UNDER FEDERALLY SPONSORED RESEARCH AND DEVELOPMENT

The United States Government has rights in this application pursuant to Contract No. DE-AC52-07NA27344 between the United States Department of Energy and Lawrence Livermore National Security, LLC for the operation of Lawrence Livermore National Laboratory.

BACKGROUND

Field of Endeavor

The present application relates to electrodes and more particularly to engineering catalytic electrodes.

State of Technology

This section provides background information related to the present disclosure which is not necessarily prior art.

Electrocatalysts play a critical role in many reactions such as hydrogen evolution reaction (HER) oxygen evolution reaction (OER), carbon dioxide reduction and exhaust gas pollutants degradation and have an indispensable impact on device efficiency and stability. While much efforts have been devoted to the materials discovery of new electrocatalysts, the morphology and architecture of the electrocatalysts has not been equally addressed. In fact, they are vital for the success of the devices. Current fabrication of catalytical electrodes is only limited to deposition/casting onto flat or 3D substrates.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's apparatus, systems, and methods provide an ink formulation and electrode that enhances hydrogen production, oxygen production, and carbon dioxide reduction. Embodiments of the inventor's apparatus, systems, and methods include an ink formulation with polymer binders having different catalytical precursors and a 3D electrode produced by additive manufacturing from the inventor's ink formulation. Various embodiments of the inventor's apparatus, systems, and methods provide inks that are 3D-printed into patterns that optimize surface area and flow. The catalytic materials are imbedded into the ink matrix which is then printed into a 3D structure that has architecture that optimizes surface area and flow properties.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

DETAILED DESCRIPTION OF SPECIFIC EMBODIMENTS

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

Hydrogen Production

Referring now to the drawings, illustrations shows example embodiments of the inventor's catalyst, apparatus, systems, and methods for hydrogen production. Traditional methods apply catalysts onto substrates to produce electrodes. Electrocatalysts for hydrogen evolution reaction play a critical role in the overall device efficiency and stability. These factors have not been optimized by existing technologies. Current fabrication of catalytical electrodes is limited to coating of flat or 3D substrates, which do not optimize these factors.

Figure 1:
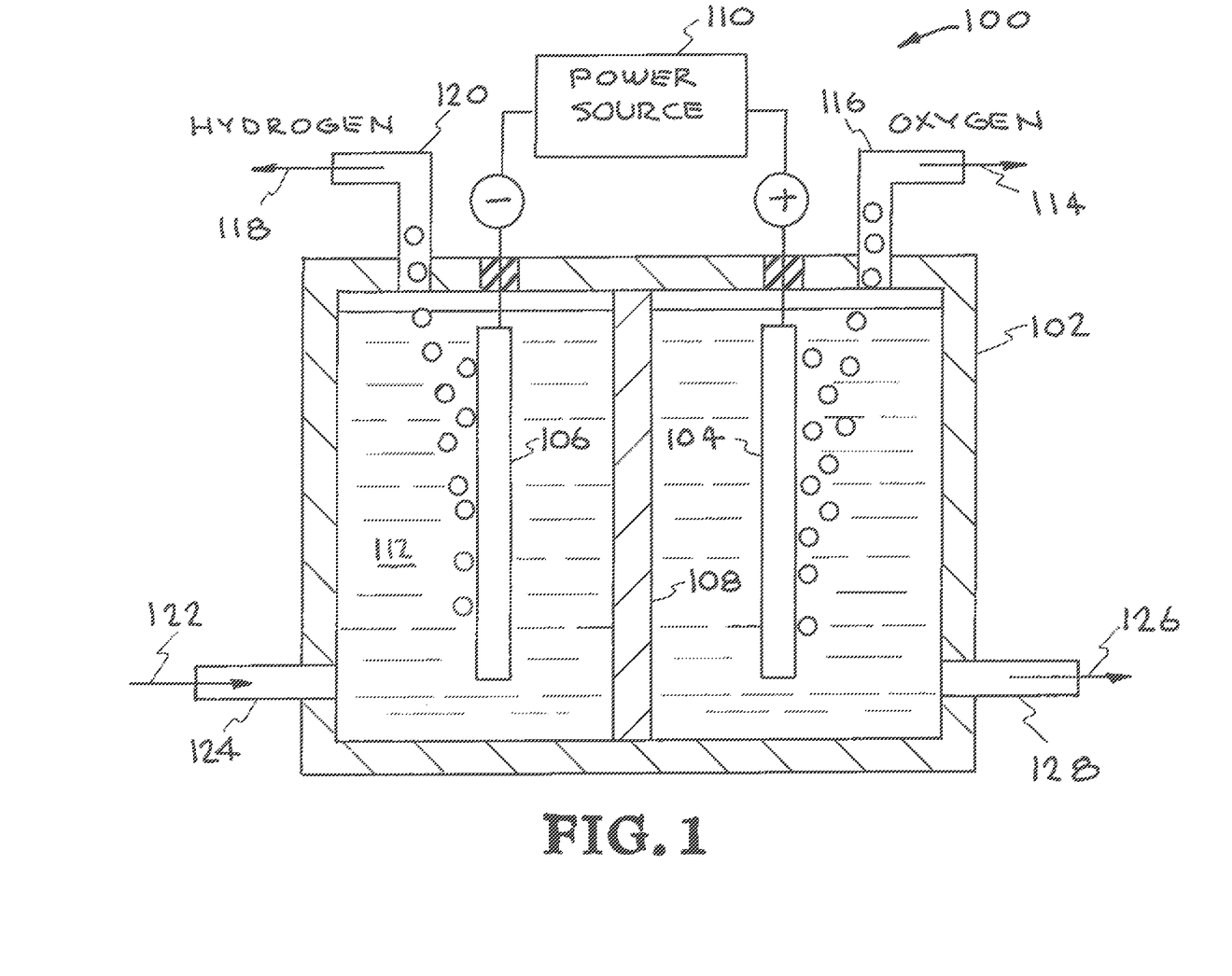
FIG. 1 shows an example embodiment of the inventors' catalyst, apparatus, systems, and methods for engineering catalytic electrodes for $H_2$ generation.

Referring now to FIG. 1, an example embodiment of the inventors' catalyst, apparatus, systems, and methods for engineering catalytic electrodes for $H_2$ generation is shown. The example embodiment is designated generally by the reference numeral 100. The components of the embodiments of the inventors' catalyst, apparatus, systems, and methods shown in FIG. 1 are listed below.

reactor vessel 102,
anode electrode 104,
cathode electrode 106,
membrane 108,
power source 110,
liquid 112,
$O_2$ 114,
outlet 116,
$H_2$ 118,
outlet 120,
liquid electrolyte source 122,
inlet 124,
liquid electrolyte out 126, and
outlet 128.

The description of the structural components of the example embodiment of the inventor's the inventors' catalyst, apparatus, systems, and methods for engineering catalytic electrodes for $H_2$ generation 100 having been completed, the operation and additional description of the inventor's apparatus, systems, and methods 100 will now be considered in greater detail. The inventor's apparatus, systems, and methods provide an ink formulation and electrode that enhances hydrogen production. Hydrogen has the potential to replace fossil fuels if it can be produced inexpensively. Embodiments of the inventor's apparatus, systems, and methods include an ink formulation with polymer binders having different catalytical precursors and a 3D electrode produced by additive manufacturing from the inventor's ink formulation. The resulting well-defined nanoporous 3D electrode has great potential in the energy related area of hydrogen production. Embodiments of the inventor's apparatus, systems, and methods can generate engineered hierarchical structure electrodes which contains digitally controlled macropores and nanopores. Advantages of the inventor's apparatus, systems, and methods include the production of tunable hierarchical pore size and distribution and enhanced surface area, and as a result, improved catalytic capability per area. Electrolysis of water is the decomposition of water into oxygen and hydrogen gas due to the passage of an electric current. This technique can be used to make hydrogen gas, a main component of hydrogen fuel. It is also called water splitting.

As illustrated in FIG. 1 a reactor vessel 102 contains the anode electrode 104 and cathode electrode 106. A membrane 108 separates the anode electrode area and the cathode electrode area of the reactor vessel 102. The cathode electrode 106 incorporates the inventor's catalyst. An inlet 124 to the reactor vessel 112 provides the introduction of water/electrolyte 122 into the reactor vessel 102. An outlet 128 from the reactor vessel 102 enables the withdrawal of water/electrolyte 126 from the reactor vessel 102. An outlet 120 to the reactor vessel 102 allows $H_2$ 118 to be produced from the reactor vessel 102. An outlet 116 from the reactor vessel 102 allows $O_2$ 114 to be released from the reactor vessel 102.

Various additional embodiments of the inventor's apparatus, systems, and methods provide inks that contain precursors of earth-abundant catalysts that are 3D-printed into patterns that optimize surface area and flow. The catalytic materials are imbedded into the ink matrix which is then printed into a 3D structure that has architecture that optimizes surface area and flow properties. Water/electrolyte flowing through that structure is exposed to more catalyst thus molecule splitting is enhanced significantly.

Figure 2:
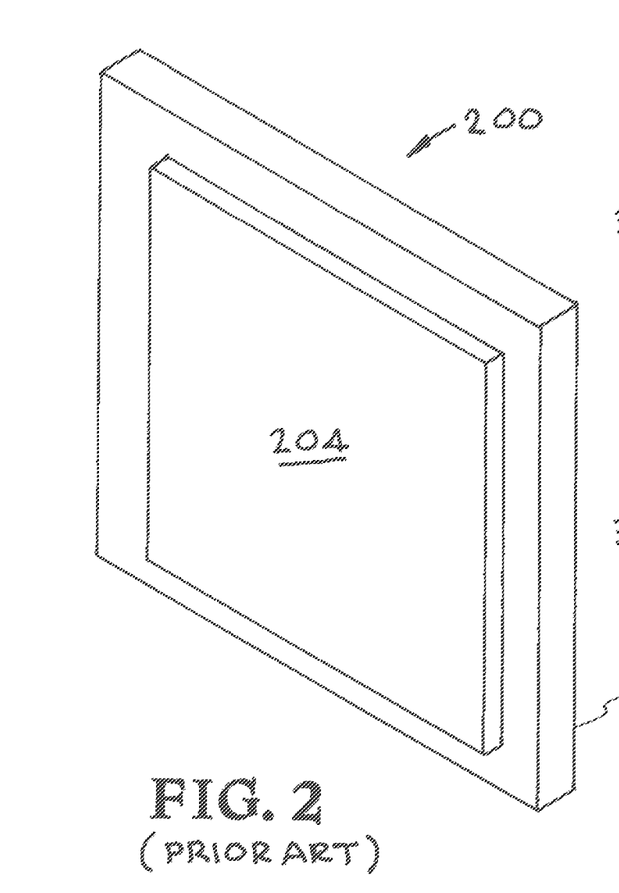
FIG. 2 shows an example of a Prior Art electrode.

Referring now to FIG. 2, an example of a Prior Art electrode with a catalyst applied for $H_2$ generation is illustrated. The Prior Art electrode is designated generally by the reference numeral 200. The components of the Prior Art electrode 200 shown in FIG. 2 are listed below.

electrode 202, and
catalyst 204.

The description of the structural components of the Prior Art electrode 200 having been completed, the operation and additional description of the Prior Art electrode 200 will now be considered in greater detail. As illustrated in FIG. 2, the electrode 202 contains a catalyst 204. The catalyst 204 is added to the electrode 202 by applying a catalyst coating to the electrode.

Figure 3:
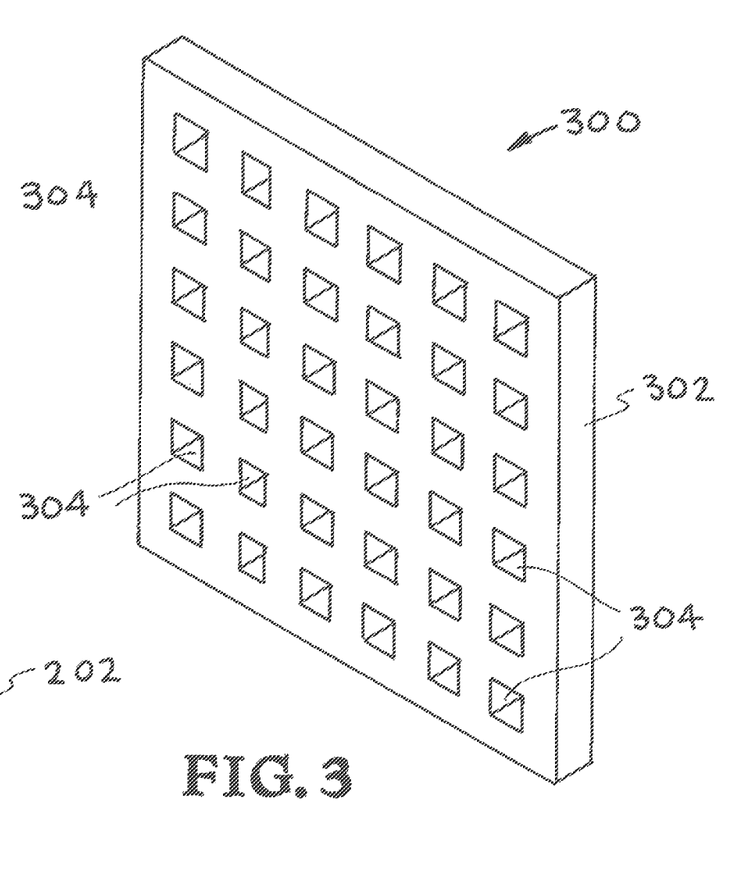
FIG. 3 shows an example of an embodiment of the inventors' electrode containing a catalyst for $H_2$ generation.

Referring now to FIG. 3, an example of an embodiment of the inventors' electrode containing a catalyst for $H_2$ generation is illustrated. The inventors' electrode is designated generally by the reference numeral 300. The components of the inventors' electrode 300 shown in FIG. 3 are listed below.

electrode 302, and
channels 304.

The description of the structural components of the inventors' electrode 300 having been completed, the operation and additional description of the inventors' electrode 300 will now be considered in greater detail. The electrode 300 has a body portion 302 and channels 304 that extend through the body portion 302. The electrode 300 is a 3D printed structure created by additive manufacturing. The electrode 302 has a lattice like structure. The physical dimensions can be varied by length, width, and height. As illustrated in FIG. 3, the individual channels 304 are inherent in the shape of the inventors' electrode 300.

Figure 4:
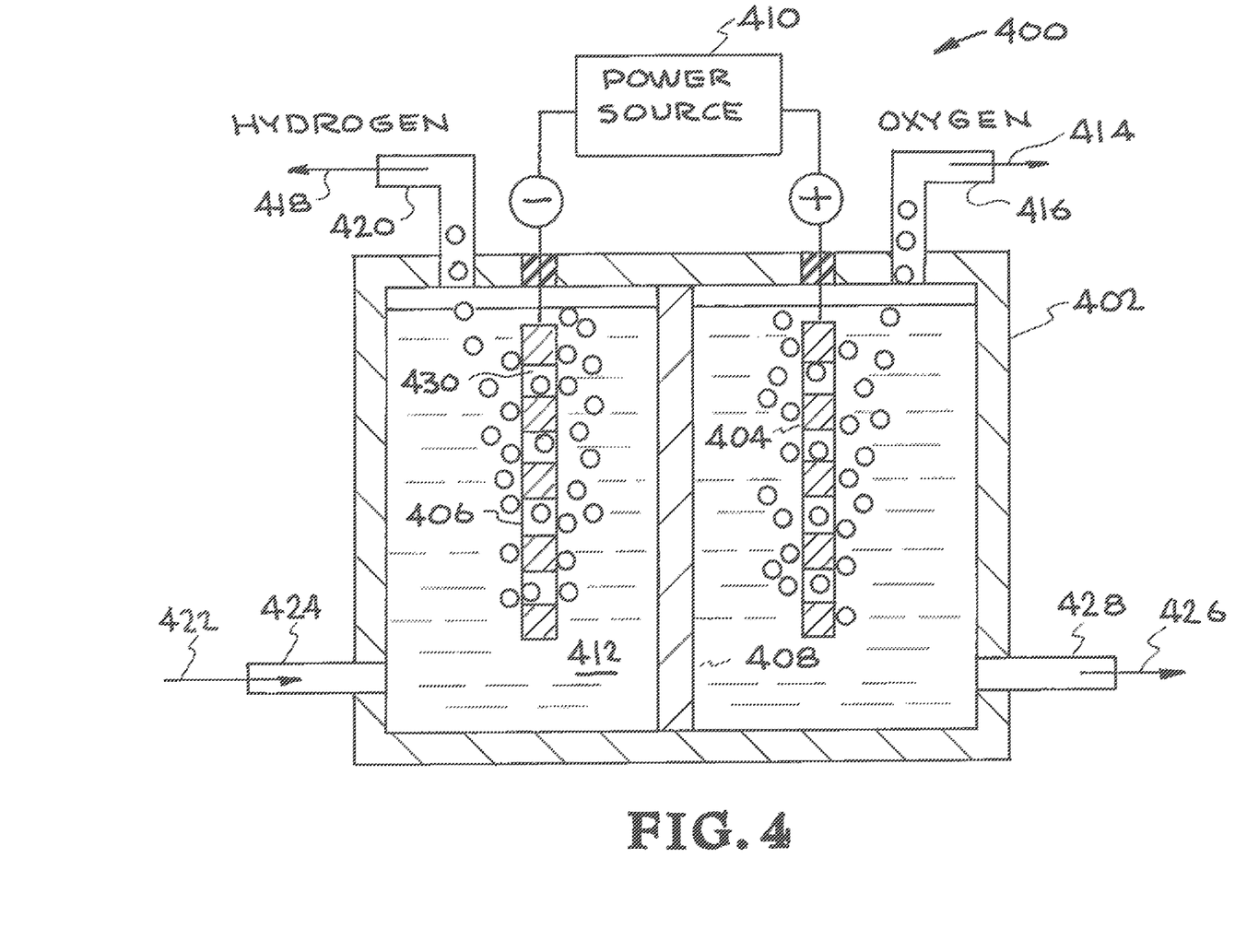
FIG. 4 shows an embodiment of the inventors' catalyst, apparatus, systems, and methods for engineering catalytic electrodes for $H_2$ generation.

Referring now to FIG. 4, the inventors' electrode containing a catalyst for $H_2$ generation as illustrated in FIG. 3 with the electrode located in reactor vessel is shown. FIG. 4 provides another example embodiment of the inventors' catalyst, apparatus, systems, and methods for engineering catalytic electrodes for $H_2$ generation. This example embodiment is designated generally by the reference numeral 400. The components of the embodiments of the inventors' catalyst, apparatus, systems, and methods shown in FIG. 4 are listed below.

reactor vessel 402,
anode electrode 404,
cathode electrode 406,
membrane 408,
power source 410,
liquid 412,
$O_2$ 414,
outlet 416,
$H_2$ 418, outlet 420,
liquid source 422,
inlet 424,
outlet liquid 426,
outlet 428, and
430 channels.

The description of the structural components of the example embodiment of the inventor's the inventors' catalyst, apparatus, systems, and methods for engineering catalytic electrodes for $H_2$ generation 400 having been completed, the operation and additional description of the inventor's apparatus, systems, and methods 400 will now be considered in greater detail. Electrolysis of water is the decomposition of water into oxygen and hydrogen gas due to the passage of an electric current. This technique can be used to make hydrogen gas, a main component of hydrogen fuel. It is also called water splitting.

As illustrated in FIG. 4 a reactor vessel 402 houses the anode electrode 404 and cathode electrode 406. A membrane 408 separates the anode electrode area and the cathode electrode area of the reactor vessel 402. Channels 430 provide a larger surface area for the electrode. The anode electrode 404 incorporates the inventor's catalyst. The cathode electrode 406 incorporates the inventor's catalyst. An inlet 424 to the reactor vessel 412 provides the introduction of water/electrolyte 422 into the reactor vessel 402. An outlet 428 from the reactor vessel 402 enables the withdrawal of water/electrolyte 426 from the reactor vessel 402. An outlet 420 to the reactor vessel 402 allows $H_2$ 418 to be produced from the reactor vessel 402. An outlet 416 from the reactor vessel 402 allows $O_2$ 414 to be released from the reactor vessel 402.

Figure 5:
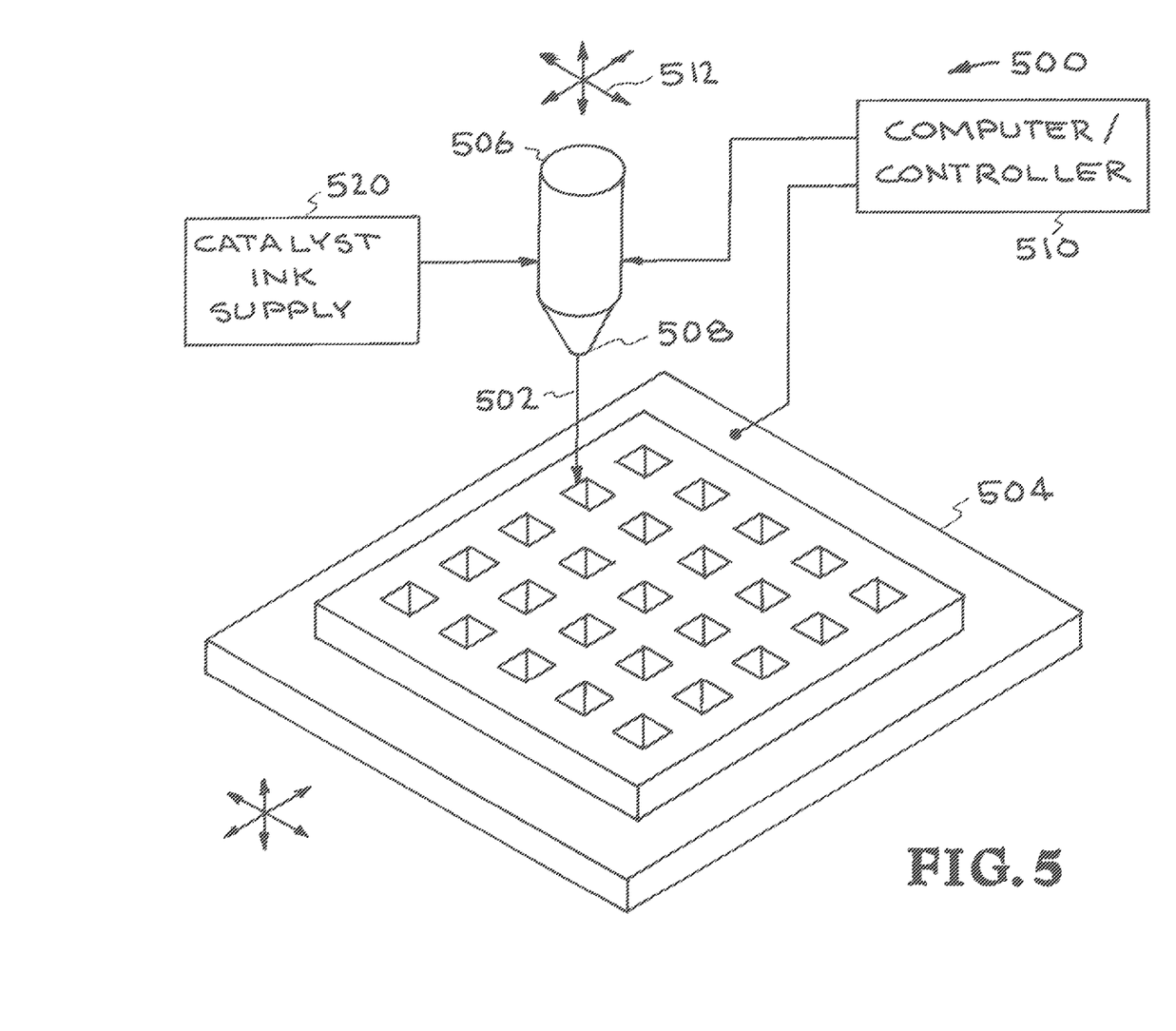
FIG. 5 shows an example embodiment of 3D printing of the inventors' electrode containing a catalyst for $H_2$ generation.

Referring now to FIG. 5, the 3D printing of the inventors' electrode containing a catalyst for $H_2$ generation is shown. The 3D printing system is designated generally by the reference numeral 500. Additive processes are used wherein successive layers of material are laid down under computer control. The three-dimensional objects can be of almost any shape or geometry and can be produced from a model or other electronic data source.

As illustrated in FIG. 5, extruded material 502 composed of inks containing precursors of earth-abundant catalysts are deposited on a surface 504 to be printed by print head 506. The print head 506 has a nozzle 508 for extruding the inks containing precursors of earth-abundant catalysts onto the surface 504. Movement of the print head 506 is controlled by computer controller 510 which provides freedom of movement along all axes as indicated by the arrows 512. The product to be created by the system 500 is fed to the computer controller 510 with the widely used numerical control programming language G-Code. The computer controller 510 uses the instructions to move the print head 506 through a series of movements along the surface 504 forming the product to be created by the system 500. The print head 506 receives the inks containing precursors of earth-abundant catalysts.

Figure 6:
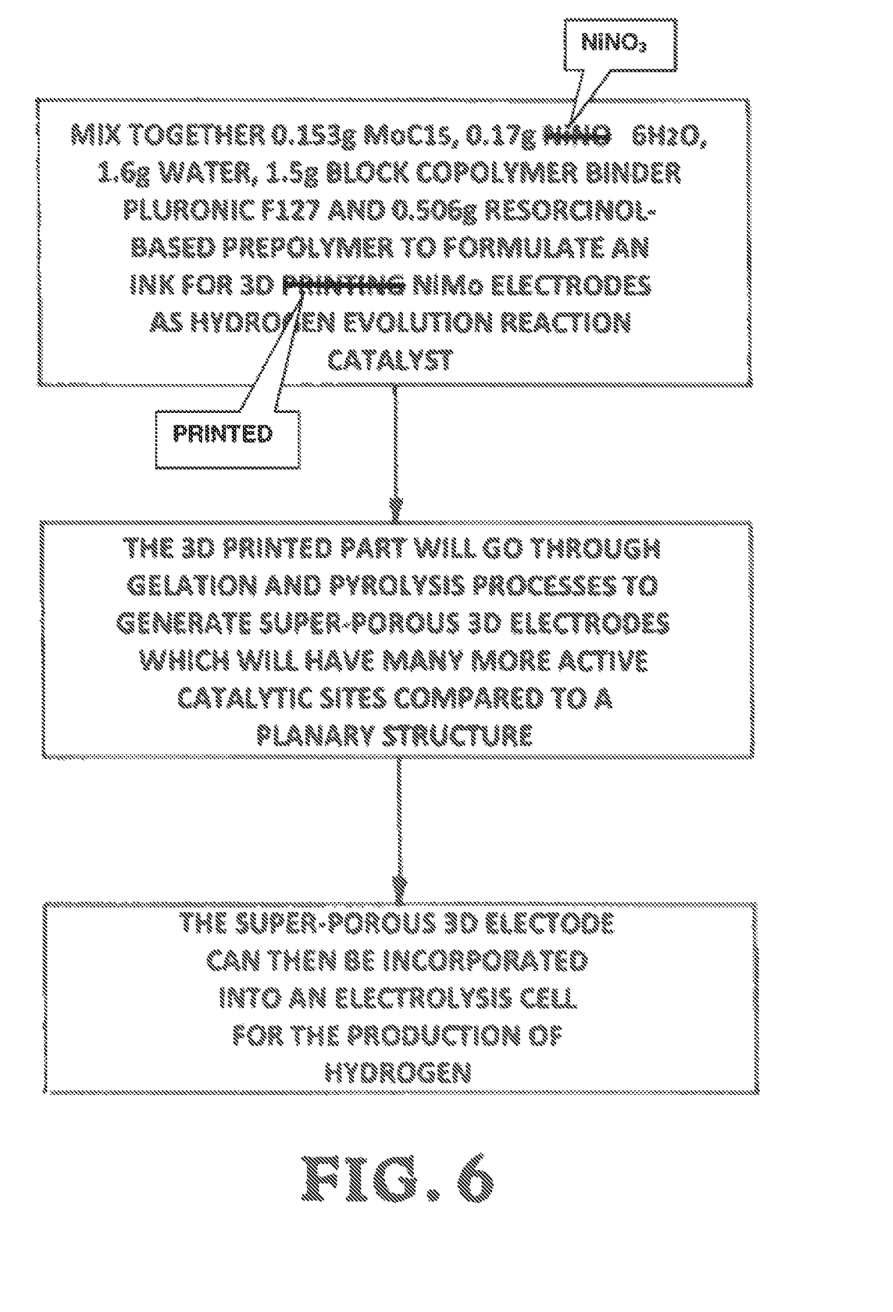
FIG. 6 is a flow chart illustrating the ink formulation that enhances hydrogen production used in the 3D printing system shown in FIG. 5.

The invented catalyst, apparatus, system, and method is schematically illustrated and described in more detail in examples. Referring now to FIG. 6, a flow chart illustrates one example of an ink formulation that enhances hydrogen production used in the 3D printing system shown in FIG. 5. The catalyst, the apparatus, the systems, and the methods are designated generally by the reference numeral 600. The flow chart illustrates an ink formulation that includes the following steps:

Step #1—Mix together 0.153 g $MoCl_5$, 0.17 g $NiNO.6H_2O$, 1.6 g water, 1.5 g block copolymer binder pluronic F127 and 0.506 g resorcinol-based prepolymer to formulate an ink for 3D printed NiMo electrodes as hydrogen evolution reaction catalyst.

Step #2—The 3D printed part will go through gelation and pyrolysis processes to generate super-porous 3D electrodes which will have many more active catalytic sites compared to a planary structure.

Step #3—The super-porous 3D electrode can then be incorporated into an electrolysis cell for the production of hydrogen.

Figure 7A:
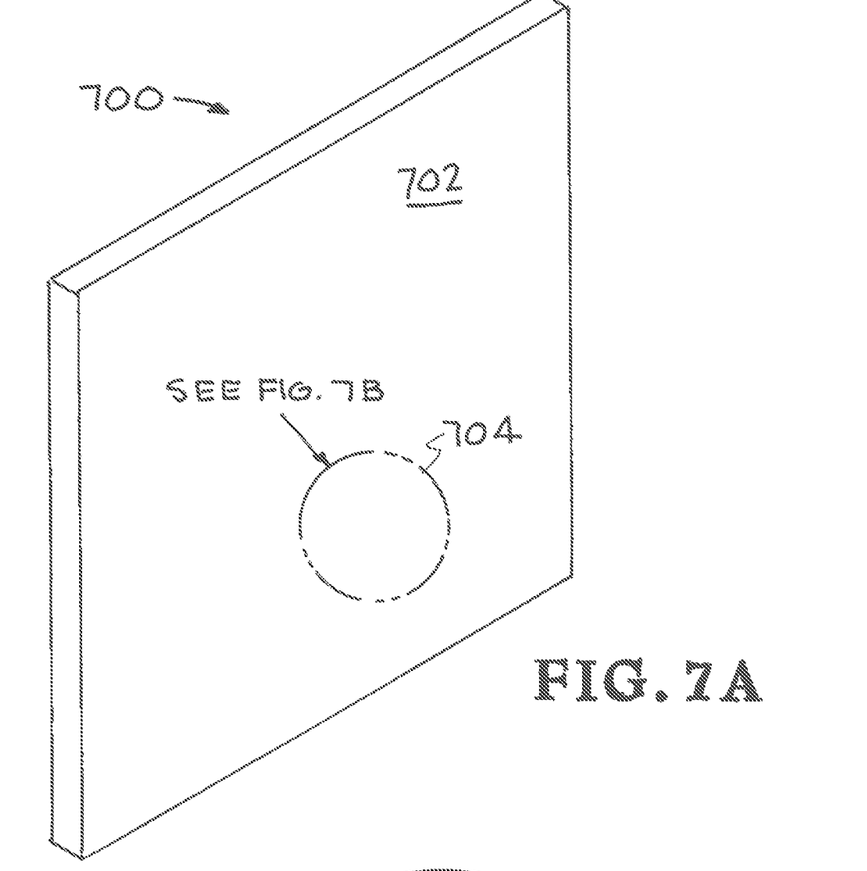
FIGS. 7A and 7B illustrate an example embodiment of the inventors' electrode containing a catalyst for $H_2$ generation.
Figure 7B:
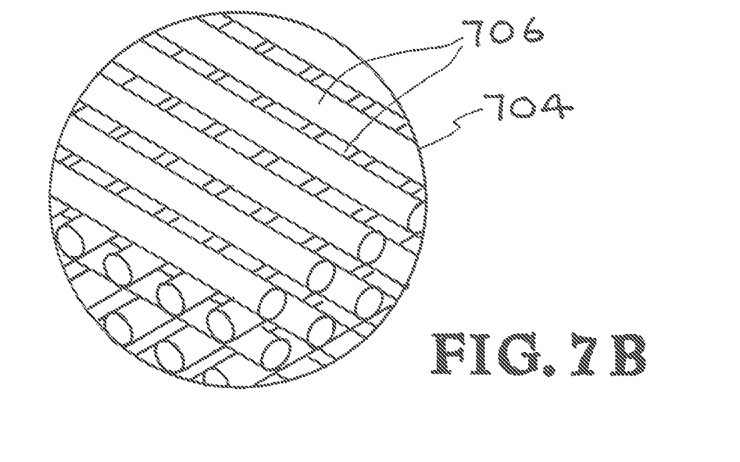

Referring now to FIGS. 7A and 7B, an example embodiment of the inventors' electrode containing a catalyst for $H_2$ generation is illustrated. The inventors' electrode shown in FIGS. 7A and 7B is designated generally by the reference numeral 700. The components of the inventors' electrode 700 shown in FIGS. 7A and 7B are listed below.

Electrode body 702,
Enlarge section of the electrode 704, and
Log pile of fibers 706.

Referring to FIG. 7A the electrode 700 has a body portion 702. The electrode 700 is a 3D printed structure created by additive manufacturing and has a lattice like structure. The physical dimensions can be varied by length, width, and height. An enlarge section 704 of the electrode 700 is shown in FIG. 7B.

Referring to FIG. 7B an enlarge section 704 of the electrode 700 is shown. The lattice like structure of the electrode 700 consists of a log pile of individual fibers 706. Void spaces around the fibers 706 provide a high surface area for the inventor's catalyst. Three-D printing produces extruded material that forms the individual fibers 706. The inventor's ink formulation that enhances hydrogen production is used in the 3D printing of the individual fibers 706. The ink can be 3D-printed into different patterns. Afterwards, a following post-process will render architectural electrode with catalysts well distributed throughout each fiber and along the 3D scaffold. The inventors' electrode 700 contains a catalyst for $H_2$ generation and provides a well-defined nanoporous 3D electrode have great potential in energy related areas such as hydrogen production.

Figure 8A:
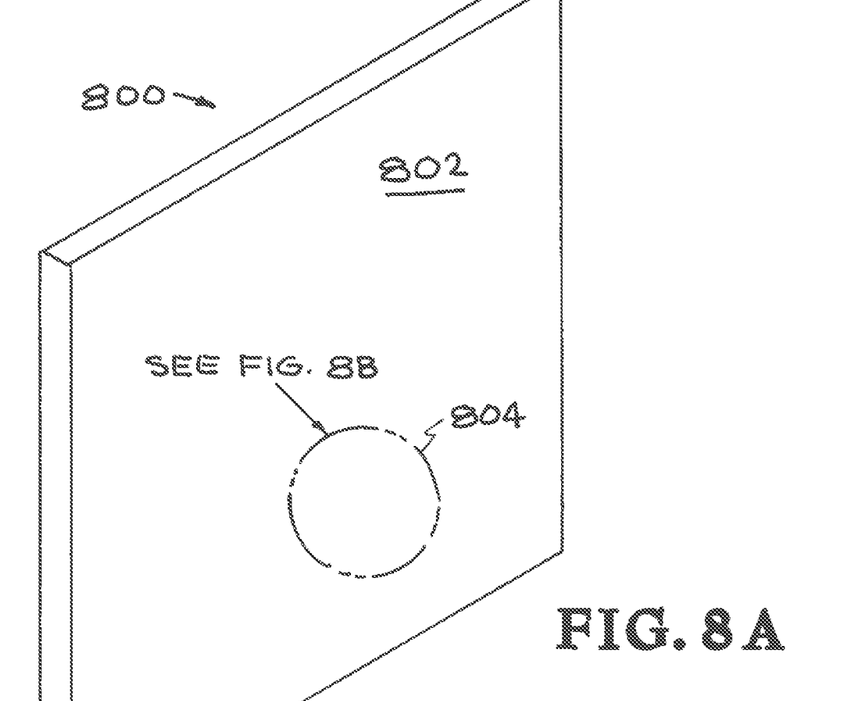
FIGS. 8A and 8B illustrate an additional example embodiment of the inventors' electrode containing a catalyst for $H_2$ generation.
Figure 8B:
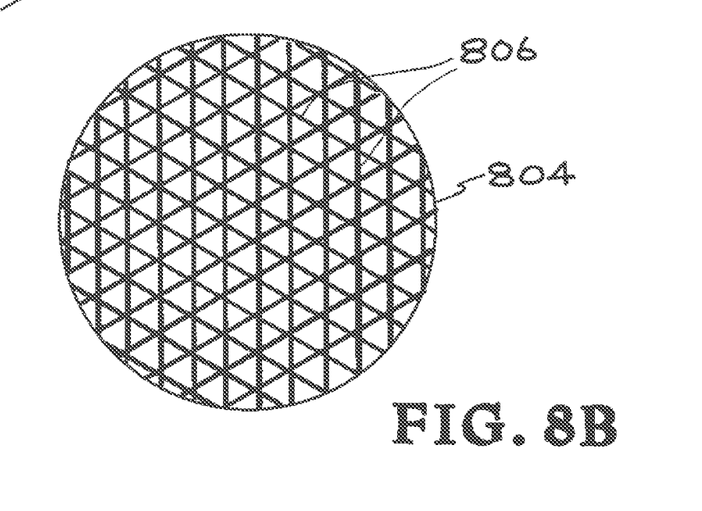

Referring now to FIGS. 8A and 8B, another example embodiment of the inventors' electrode containing a catalyst for $H_2$ generation is illustrated. The inventors' electrode shown in FIGS. 8A and 8B is designated generally by the reference numeral 800. The components of the inventors' electrode 800 shown in FIGS. 8A and 8B are listed below.

Electrode body 802,
Enlarge section of the electrode 804, and
Lattice of fibers 806.

Referring to FIG. 8A the electrode 800 has a body portion 802. The electrode 800 is a 3D printed structure created by additive manufacturing and has a lattice like structure. The physical dimensions can be varied by length, width, and height. An enlarge section 804 of the electrode 800 is shown in FIG. 8B.

Referring to FIG. 8B an enlarge section 804 of the electrode 800 is shown. The lattice like structure of the electrode 800 consists of individual fibers 806. Void spaces around the fibers 806 provide a high surface area for the inventor's catalyst. Three-D printing produces extruded material that forms the lattice of individual fibers 806. The inventor's ink formulation that enhances hydrogen production is used in the 3D printing of the individual fibers 806. The ink can be 3D-printed into different patterns. Afterwards, a following post-process will render architectural electrode with catalysts well distributed throughout each fiber and along the 3D scaffold. The inventors' electrode 800 contains a catalyst for $H_2$ generation and provides a well-defined nanoporous 3D electrode have great potential in energy related areas such as hydrogen production.

Figure 9:
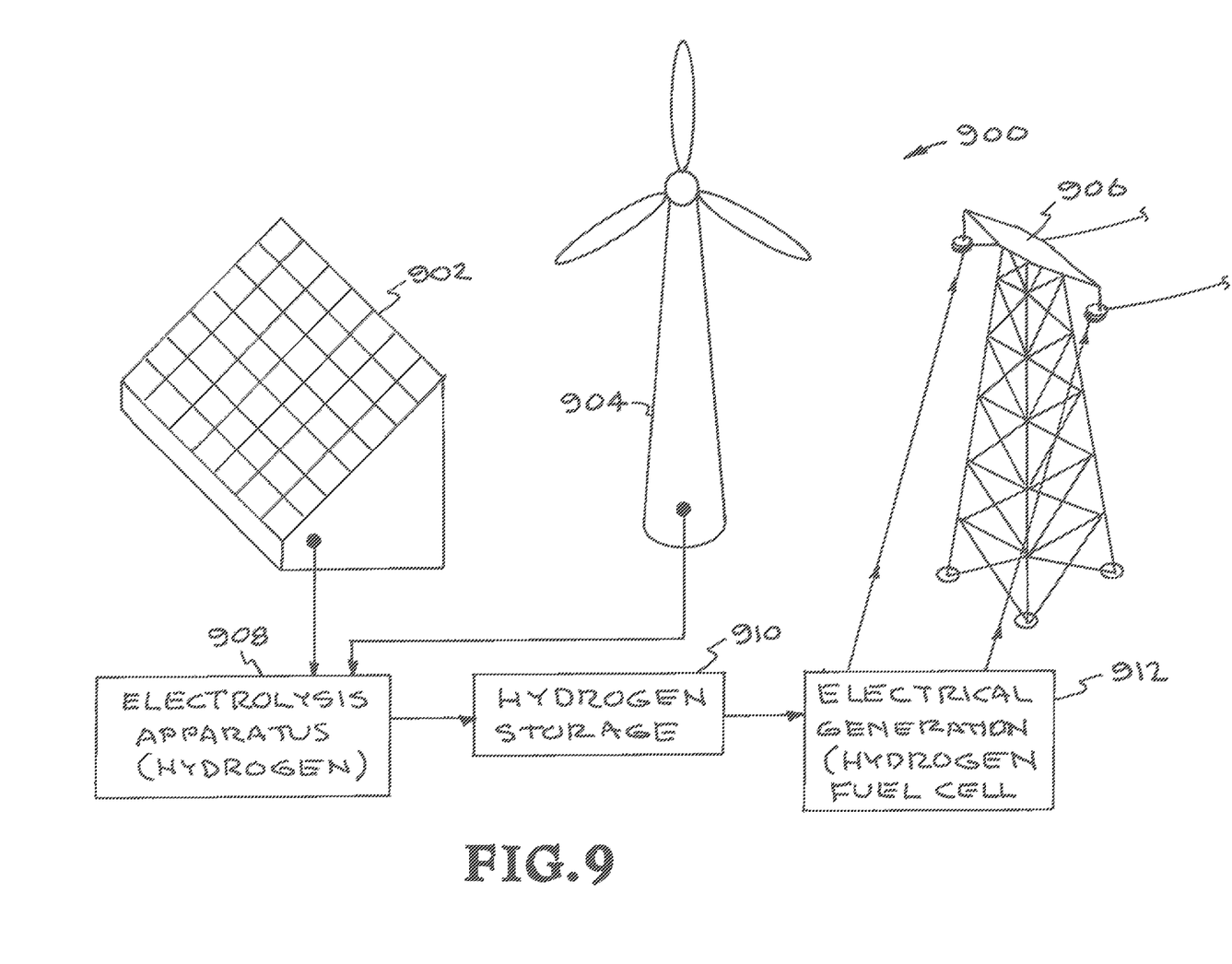
FIG. 9 illustrates an example of a next generation storage system for renewable power systems (solar, wind) utilizing the inventors' catalyst, apparatus, systems, and methods for engineering catalytic electrodes for $H_2$ generation.

Referring now to FIG. 9, an example of a next generation storage system for renewable power systems (solar, wind) utilizing the inventors' catalyst, apparatus, systems, and methods for engineering catalytic electrodes for $H_2$ generation is illustrated. The next generation storage system example is designated generally by the reference numeral 900. The components of the next generation storage system 900 shown in FIG. 9 are listed below.

Solar power source 902,
Wind power source 904,
Electrical grid 906,
electrolysis apparatus 908,
hydrogen storage unit 910, and
fuel cell 912.

The description of the components of the next generation storage system for renewable power systems utilizing the inventor's the inventors' catalyst, apparatus, systems, and methods for engineering catalytic electrodes for $H_2$ generation 900 having been completed, the operation and additional description of the inventor's systems and methods 900 will now be considered in greater detail. As illustrated in FIG. 9 the electrical grid 906 receives power from the hydrogen fuel cell 912. The hydrogen fuel cell 912 receive stored hydrogen from the hydrogen storage unit 910. The hydrogen storage unit 910 receives hydrogen from the electrolysis apparatus 908. The electrolysis apparatus 908 is powered by the solar power source 902 or the wind power source 904 or from both the solar power source 902 and the wind power source 904.

An example of the electrolysis apparatus 908 is the system 100 shown in FIG. 1 that includes a reactor vessel 102 containing an anode electrode 104. The cathode electrode 106 incorporates the inventor's catalyst. The inventor's catalyst is provided in an ink formulation that enhances hydrogen production and is produced using a 3D printing system. The ink formulation that includes the step: "Mix together 0.153 g $MoCl_5$, 0.17 g $NiNO_3 \cdot 6H_2O$, 1.6 g water, 1.5 g block copolymer binder pluronic F127 and 0.506 g resorcinol-based prepolymer" to formulate an ink for 3D printing NiMo electrodes as hydrogen evolution reaction catalyst. An inlet 124 to the reactor vessel 112 provides the introduction of water/electrolyte 122 into the reactor vessel 102. The power source 110 energizes the cathode electrode 106 producing hydrogen ($H_2$) in the reactor vessel 102. An outlet 120 to the reactor vessel 102 allows $H_2$ 118 to be removed from the reactor vessel 102 and directed to the hydrogen storage unit 910.

Oxygen Production

The inventor's apparatus, systems, and methods provide an ink formulation and electrode that enhances oxygen production. Embodiments of the inventor's apparatus, systems, and methods include an ink formulation with polymer binders having different catalytical precursors and a 3D electrode produced by additive manufacturing from the inventor's ink formulation. The resulting well-defined nanoporous 3D electrode has great potential in oxygen production. Embodiments of the inventor's apparatus, systems, and methods can generate engineered hierarchically structural electrodes which contains digitally controlled macropores and nanopores. Advantages of the inventor's apparatus, systems, and methods include the production of tunable hierarchical pore size and distribution and enhanced surface area, and as a result, improved catalytic capability per area. Electrolysis of water is the decomposition of water into oxygen and hydrogen gas due to the passage of an electric current. This technique can be used to make oxygen gas.

Referring again to FIG. 1, an example embodiment of the inventors' catalyst, apparatus, systems, and methods for engineering catalytic electrodes for oxygen generation is shown. As illustrated in FIG. 1 a reactor vessel 102 contains an anode electrode 104. The anode electrode 104 incorporates the inventor's catalyst. An inlet 124 to the reactor vessel 112 provides the introduction of water/electrolyte 122 into the reactor vessel 102. The power source 110 energizes the anode electrode 104 producing oxygen in the reactor vessel 102. An outlet 116 to the reactor vessel 102 allows oxygen 114 to be removed from the reactor vessel 102.

Figure 10:
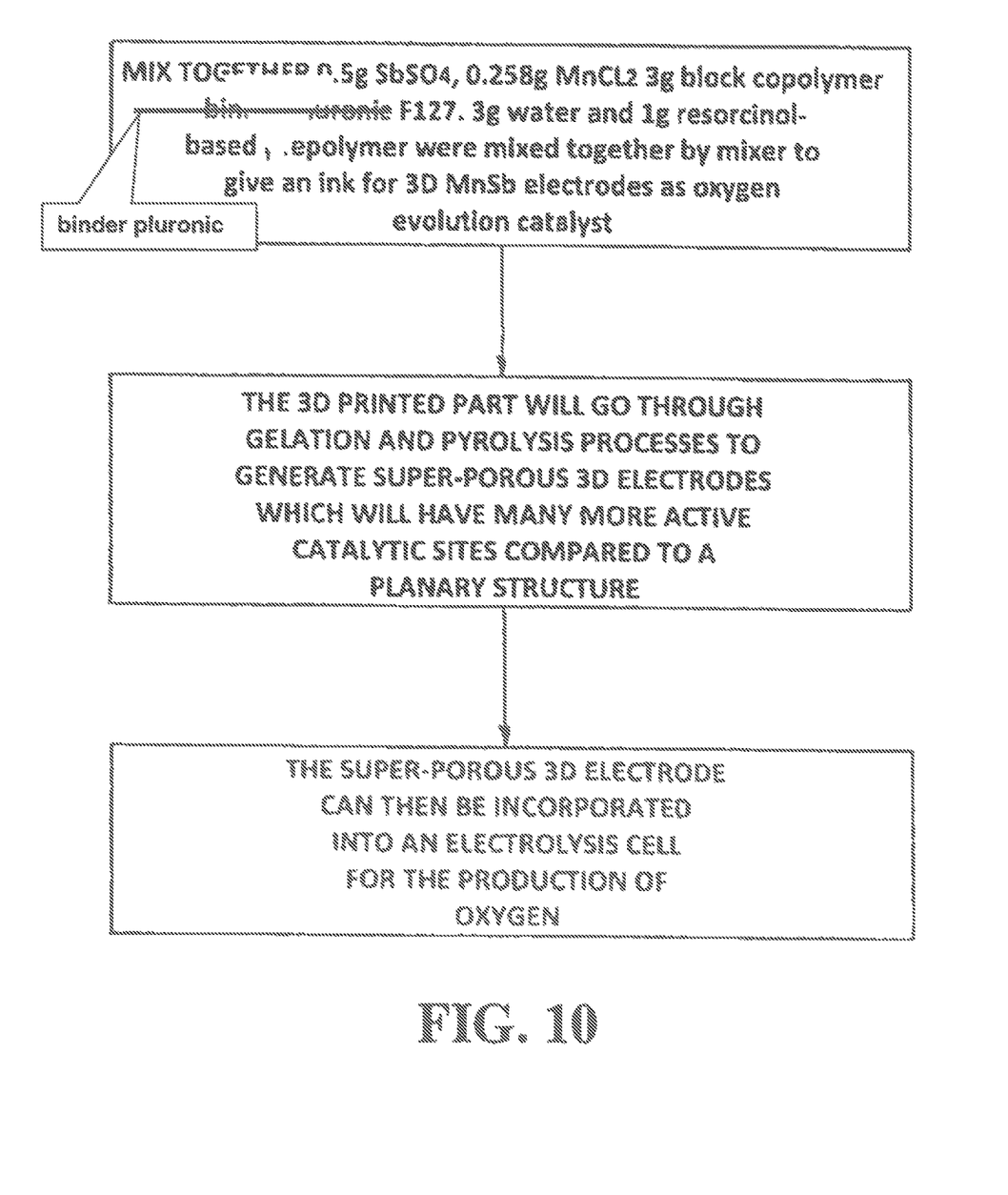
FIG. 10 is a flow chart that illustrates one example of an ink formulation that enhances oxygen production.

Referring now to FIG. 10, a flow chart illustrates one example of an ink formulation that enhances oxygen production. The flow chart illustrates an ink formulation that includes the following steps:

Step #1—Mix together 0.5 g $SbSO_4$, 0.258 g $MnCl_2$, 3 g block copolymer binder pluronic F127, 3 g water and 1 g resorcinol-based prepolymer to formulate an ink for 3D printing MnSb electrodes as an oxygen evolution reaction catalyst.

Step #2—The 3D printed part will go through gelation and pyrolysis processes to generate super-porous 3D electrodes which will have many more active catalytic sites compared to a planary structure.

Step #3—The super-porous 3D electrode can then be incorporated into an electrolysis cell for the production of oxygen.

Carbon Dioxide Reduction

The inventor's apparatus, systems, and methods provide an ink formulation and electrode for carbon dioxide reduction. Embodiments of the inventor's apparatus, systems, and methods include an ink formulation with polymer binders having different catalytical precursors and a 3D electrode produced by additive manufacturing from the inventor's ink formulation. The resulting well-defined nanoporous 3D electrode has great potential in carbon dioxide reduction. Embodiments of the inventor's apparatus, systems, and methods can generate engineered hierarchically structural electrodes which contains digitally controlled macropores and nanopores. Advantages of the inventor's apparatus, systems, and methods include the production of tunable hierarchical pore size and distribution and enhanced surface area, and as a result, improved catalytic capability per area.

Figure 11:
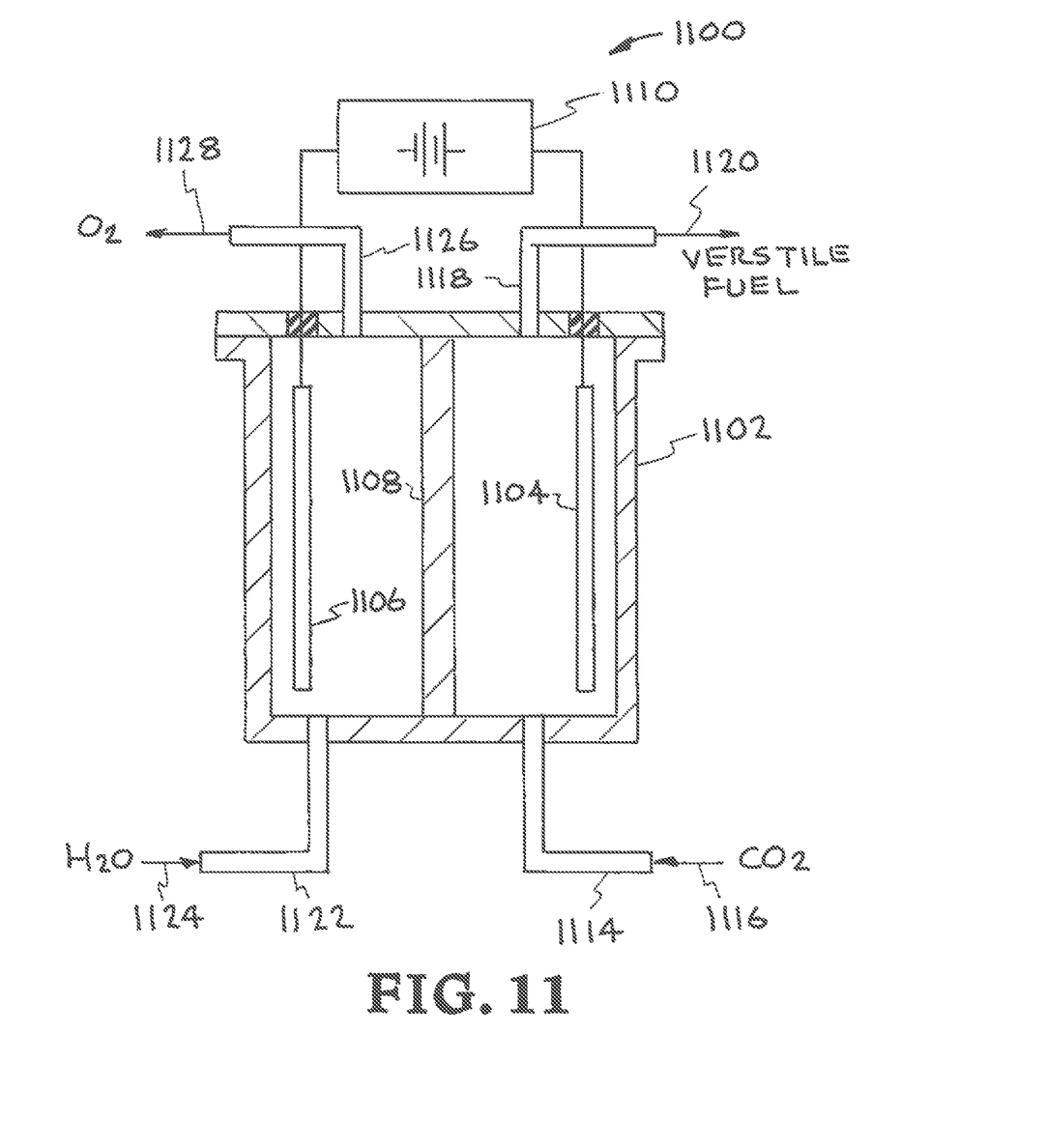
FIG. 11 is an illustration showing an example embodiment of the inventor's catalyst, apparatus, system, and method for carbon dioxide reduction.

Referring now to FIG. 11, an illustration shows an example embodiment of the inventor's catalyst, apparatus, system, and method for carbon dioxide reduction. The example embodiment is designated generally by the reference numeral 1100. The components of the embodiment of the inventors' catalyst, apparatus, system, and method for carbon dioxide reduction shown in FIG. 11 are listed below.

reactor vessel 1102,
anode electrode 1104,
cathode electrode 1106,
membrane 1108,
power source 1110,
$CO_2$ inlet 1114,
$CO_2$ 1116,
outlet 1118,
versatile fuel 1120,
$H_2O$ inlet 1122,
$H_2O$ 1124,
outlet 1126, and
$O_2$ 1128.

The reactor vessel 1102 houses the anode electrode 1104 and cathode electrode 1106. An electrolyzer membrane 1108 separates the anode electrode area and the cathode electrode area of the reactor vessel 1102. An inlet 1114 to the reactor vessel 1102 provides the introduction of $CO_2$ 1116 into the reactor vessel 1102. An outlet 1118 from the reactor vessel 1102 enables the withdrawal of versatile fuels 1120 from the reactor vessel 1102. An inlet 1122 to the reactor vessel 1102 provides the introduction of $H_2O$ 1124 into the reactor vessel 1102. An outlet 1126 from the reactor vessel 1102 enables the withdrawal of $O_2$ 1128 from the reactor vessel 1102.

Figure 12:
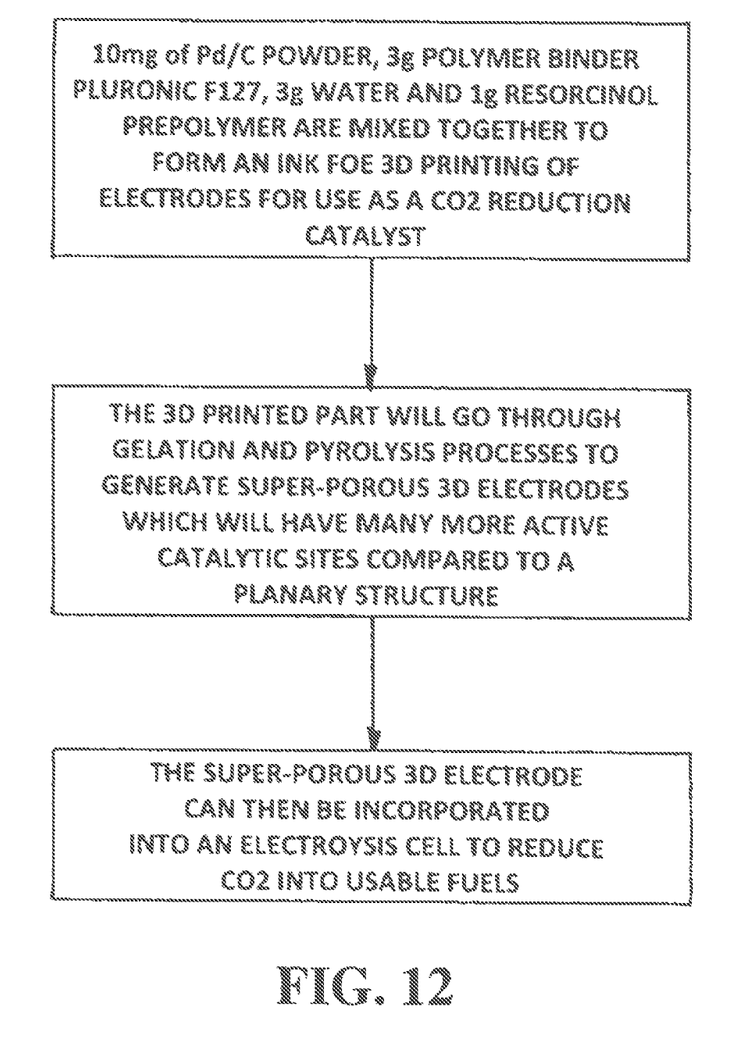
FIG. 12 is a flow chart that illustrates one example of an ink for $CO_2$ reduction catalyst.

Referring now to FIG. 12, a flow chart illustrates one example of an ink for $CO_2$ reduction catalyst. The flow chart illustrates an ink formulation that includes the following steps:

Step #1—10 mg of Pd/C powder, 3 g polymer binder pluronic F127, 3 g water and 1 g resorcinol prepolymer were mixed together by mixer to give an ink for 3D Pd electrodes as $CO_2$ reduction catalyst.

Step #2—The 3D printed part will go through gelation and pyrolysis processes to generate super-porous 3D electrodes which will have many more active catalytic sites compared to a planary structure.

Step #3—The super-porous 3D electrode can then be incorporated into an electrolysis cell for carbon dioxide reduction.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for producing oxygen, comprising:
a reactor vessel,
a cathode electrode in the reactor vessel,
an anode electrode in the reactor vessel wherein said cathode electrode has a three-dimensional printed structure created by additive manufacturing with an ink formulation having polymer binders with catalytical precursors, wherein said ink formulation having polymer binders with catalytical precursors includes 0.5 g $SbSO_4$, 0.258 g $MnCl_2$, 3 g block copolymer binder pluronic F127, 3 g water and 1 g resorcinol-based prepolymer,
an electrolyte in the reactor vessel between said anode electrode and said cathode electrode,
a membrane in the reactor vessel between said anode electrode and said cathode electrode,
a power source for enhancing an electrical potential between said anode electrode and said cathode electrode, and
an oxygen outlet defining a passage from the reactor vessel for producing oxygen.

* * * * *